(12) United States Patent
Song et al.

(10) Patent No.: US 11,993,133 B2
(45) Date of Patent: May 28, 2024

(54) VEHICLE CONTROL APPARATUS AND VEHICLE CONTROL METHOD

(71) Applicants: Hyundai Motor Company, Seoul (KR); Kia Corporation, Seoul (KR)

(72) Inventors: Dae Hyun Song, Hwaseong-Si (KR); Tae Hyeong Kim, Seoul (KR); Jang Hyo Lee, Hwaseong-si (KR); Tae Hun Jung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/948,619

(22) Filed: Sep. 20, 2022

(65) Prior Publication Data
US 2023/0294485 A1 Sep. 21, 2023

(30) Foreign Application Priority Data
Feb. 25, 2022 (KR) ........................ 10-2022-0025431

(51) Int. Cl.
*B60H 1/32* (2006.01)
*B60H 1/00* (2006.01)

(52) U.S. Cl.
CPC ........... *B60H 1/3216* (2013.01); *B60H 1/004* (2013.01); *B60H 1/3222* (2013.01); *B60H 2001/3255* (2013.01); *B60H 2001/327* (2013.01); *B60H 2001/3292* (2013.01)

(58) Field of Classification Search
CPC .... B60H 1/3216; B60H 1/004; B60H 1/3222; B60H 2001/3255; B60H 2001/327; B60H 2001/3292
See application file for complete search history.

(56) References Cited

U.S. PATENT DOCUMENTS

| 7,201,010 B2 | 4/2007 | Homan et al. | |
| 2004/0045307 A1* | 3/2004 | Iwata | B60H 1/3222 62/236 |
| 2018/0086181 A1* | 3/2018 | Connell | B60H 1/3208 |
| 2021/0276537 A1* | 9/2021 | Hasegawa | B60W 10/08 |

FOREIGN PATENT DOCUMENTS

| JP | 2003-291633 A | 10/2003 |
| JP | 2004-336832 A | 11/2004 |
| JP | 2011-046279 A | 3/2011 |
| JP | 2013-086529 A | 5/2013 |
| KR | 10-0495119 B | 6/2005 |
| KR | 10-1935772 B | 1/2019 |

* cited by examiner

*Primary Examiner* — Marc E Norman
(74) *Attorney, Agent, or Firm* — Banner & Witcoff, Ltd.

(57) ABSTRACT

Vehicle control apparatus and vehicle control method are described. The vehicle control apparatus may include a compressor and a controller. The controller may determine a thermal load level at one or more of: a first time point at which an engine is switched to an ON state from an OFF state, a second time point at which a first discharge amount of the battery exceeds a first reference value while the engine is in the OFF state, or a third time point at which a second discharge amount of the battery exceeds a second reference value smaller than the first reference value and a discharge rate associated with the battery exceeds a third reference value while the engine is in the OFF state. The controller may control the compressor using a control value corresponding to the thermal load level.

20 Claims, 7 Drawing Sheets

VEHICLE CONTROL APPARATUS AND VEHICLE CONTROL METHOD

CROSS-REFERENCE TO RELATED APPLICATION

This application claims the benefit of priority to Korean Patent Application No. 10-2022-0025431, filed in the Korean Intellectual Property Office on Feb. 25, 2022, the entire contents of which are incorporated herein by reference.

TECHNICAL FIELD

The present disclosure relates to a vehicle control apparatus and a vehicle control method.

BACKGROUND

A hybrid vehicle's air conditioning system may be a fully automatic air conditioner which adopts an electric compressor to improve indoor cooling and heating performance.

An electric compressor's operation may be determined according to a thermal load of the vehicle, and may continue to operate until the vehicle's indoor temperature reaches a target indoor temperature. However, even though the electric compressor is not operated constantly and the operating amount thereof is reduced intermittently, a discharge temperature may not change significantly (e.g., due to the medium of air, due to the property of the thermal inertia), and accordingly, the change of the indoor temperature may be slower.

Accordingly, there is a need to develop a technology capable of improving air conditioning fuel efficiency by more efficiently controlling a battery of a hybrid vehicle by using properties of the electric compressor.

SUMMARY

The following summary presents a simplified summary of certain features. The summary is not an extensive overview and is not intended to identify key or critical elements.

An apparatus (e.g., the apparatus(s), devices, etc. described herein) may perform a method comprising multiple operations. The apparatus may comprise: a compressor configured to receive power from a battery; and a controller configured to: determine a thermal load level at one or more of: a first time point at which an engine is switched to an ON state from an OFF state; a second time point at which a first discharge amount of the battery exceeds a first reference value while the engine is in the OFF state; or a third time point at which a second discharge amount of the battery exceeds a second reference value smaller than the first reference value and a discharge rate associated with the battery exceeds a third reference value while the engine is in the OFF state; and control the compressor using a control value corresponding to the thermal load level.

A method may comprise multiple operations. The method may comprise: determining a thermal load level at one or more of: a first time point at which an engine is switched to an ON state from an OFF state; a second time point at which a first discharge amount of the battery exceeds a first reference value while the engine is in the OFF state; or a third time point at which a second discharge amount of the battery exceeds a second reference value smaller than the first reference value and a discharge rate associated with the battery exceeds a third reference value while the engine is in the OFF state; and controlling a compressor, configured to receive power from the battery, using a control value corresponding to the thermal load level.

An apparatus (e.g., the apparatus(s), devices, etc. described herein) may perform a method comprising multiple operations. The apparatus may comprise an air conditioner configured to receive power from a battery; and a controller configured to: determine a thermal load level based on one or more of: a first discharge amount of the battery satisfying a first reference value while an engine is in a dormant state, wherein the engine is configured to operate a vehicle using a non-electric power source; or a second discharge amount of the battery satisfying a second reference value and a discharge rate associated with the battery satisfying a third reference value while the engine is in the dormant state; and control the air conditioner using a control value corresponding to the thermal load level.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
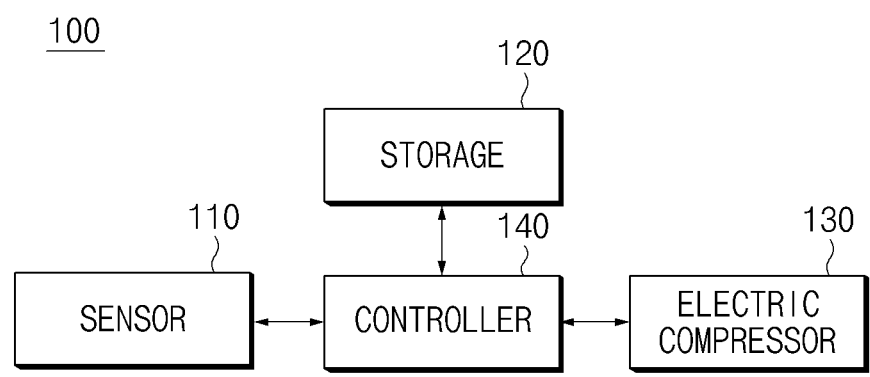
FIG. 1 is an example diagram illustrating a configuration of a vehicle control apparatus.

Hereinafter, some embodiments of the present disclosure will be described in detail with reference to the exemplary drawings. In adding the reference numerals to the components of each drawing, it should be noted that the identical or equivalent component may be designated by the identical numeral even when they are displayed on other drawings. Further, in describing the embodiment(s) of the present disclosure, a detailed description of the related known configuration or function may be omitted when it is determined that it interferes with the understanding of the embodiment(s) of the present disclosure.

In describing the components of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same or similar meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an example diagram illustrating a configuration of a vehicle control apparatus.

Referring to FIG. 1, a vehicle control apparatus 100 may include a sensor 110, storage 120, a compressor (e.g., an electric compressor 130), and a controller 140.

The sensor 110 may include a temperature sensor for detecting a vehicle's indoor and outdoor temperature, and an evaporator temperature, a blower motor sensor for detecting a driving level of a blower, a photo sensor for detecting a solar insolation, a battery sensor for detecting a discharge amount of a battery, and the like. Each of the components shown in FIG. 1 and other figures may further include subcomponents, such as a processor, volatile memory, non-volatile memory, an input device, an output device, a bus, etc.

The storage 120 may store at least one or more logics, algorithms, instructions, and/or programs for performing operations or execution of various commands for the operation of the vehicle control apparatus. The storage 120 may include at least one medium of a flash memory, a hard disk, a memory card, a Read-Only Memory (ROM), a Random Access Memory (RAM), an Electrically Erasable Programmable Read-Only Memory (EEPROM), a Programmable Read-Only Memory (PROM), a magnetic memory, a magnetic disk, an optical disk, a solid-state memory type (e.g., a solid-state drive (SSD)), a cache memory, etc.

The compressor (e.g., the electric compressor 130) may be operated under the control of the controller 140 based on information obtained by the sensor 110. The electric compressor 130 may be operated such that the indoor temperature of the vehicle reaches the target temperature under the control of the controller 140, for example, if a target temperature is set by a user or other parties.

The controller 140 may be implemented by various processing devices such as a microprocessor incorporating a semiconductor chip capable of operating or executing various instructions or the like and may control an operation of the vehicle control apparatus. The controller 140 may perform overall control such that each of the components may perform their functions as intended. The controller 140 may be implemented in the form of hardware (e.g., processor, memory, etc.), or may be implemented in the form of software (e.g., firmware, application, etc.), or may be implemented in the form of a combination of hardware and software. The controller 140 may be implemented as a microprocessor, but is not limited thereto. For example, the controller 140 may include at least one of a central processing unit (CPU), a graphics processing unit (GPU), a field-programmable gate array (FPGA), an application specific integrated circuit (ASIC), a system-on-chip, etc.

The controller 140 may operate the electric compressor, for example, if an air conditioner switch is turned on by the user. The controller 140 may receive an engine control signal (e.g., an ON or OFF signal) of an engine from a hybrid control unit and determine a state (e.g., an ON or OFF state) of the engine.

The controller 140 may determine whether the engine is in a first state (e.g., a dormant state, the OFF state, etc.). The controller 140 may allow the vehicle to travel with operation in an EV mode (motor driving), for example, if the engine is in the first state.

The controller 140 may determine whether the engine is switched from the first state to a second state (e.g., an active state, the ON state, etc.), and may determine a time point at which the engine is switched back to the second state from the first state as a first time point. The controller 140 may (e.g., continuously or periodically) receive a signal from the engine and determine a state of the engine, for example, if the engine is not switched from the first state to the second state.

The controller 140 may determine whether the discharge amount of a battery satisfies (e.g., exceeds) a first reference value, for example, if the engine is in the first state. The controller 140 may determine a time point at which the discharge amount of the battery satisfies (e.g., exceeds) the first reference value, for example, if the engine is in the first state as a second time point.

The controller 140 may determine whether the discharge amount of the battery satisfies (e.g., exceeds) a second reference value (e.g., that is smaller than the first reference value), for example, if it is determined (e.g., by the controller 140 or any other components) that the discharge amount of the battery does not satisfy (e.g., exceed) the first reference value (A(ampere)/s(sec)) (e.g., 5% of the capacity of the battery, or any other discharge amount) while the engine is in the first state.

The controller 140 may determine whether a discharge rate associated with the battery (e.g., an instantaneous change rate of discharge amount(s) of the battery at a time point) (see e.g., FIG. 4) satisfies (e.g., exceeds) a third reference value($A/s^2$) (e.g., 1% of the capacity of the battery per minute, 10% of the capacity of the battery per hour, or any other change rate of the battery discharge), for example, if it is determined (e.g., by the controller 140 or any other components) that the discharge amount of the battery satisfies (e.g., exceeds) the second reference value (A/s) (e.g., 3% of the capacity of the battery, or any other discharge amount). The controller 140 may determine a time point at which the instantaneous change rate of the discharge amount(s) of the battery satisfies (e.g., exceeds) the third reference value as a third time point, for example, if it is determined (e.g., by the controller 140 or any other components) that the instantaneous change rate of the discharge amount(s) of the battery satisfies (e.g., exceeds) the third reference value.

The controller 140 may determine a thermal load level (e.g., a controlling thermal load level, a final thermal load level determined from one or more categorized thermal load levels and/or from one or more categorized thermal loads described below) at any one of the first time point, the second time point, and/or the third time point determined as described above. The categorized thermal load level(s) may be referred to as itemized thermal load level(s), or the like. The categorized thermal load(s) may be referred to as itemized thermal load(s), or the like.

The controller 140 may determine thermal loads (e.g., categorized thermal loads) respectively caused by at least one of the followings: the vehicle's outdoor temperature, the evaporator temperature, an initial control value of the electric compressor, a blower driving level, the vehicle's indoor temperature, a solar insolation, and/or a setting temperature of the user. The controller 140 may determine a thermal load level (e.g., a categorized thermal load level) for each item based on each thermal load (e.g., categorized thermal load) as shown in Table 1.

TABLE 1

| Items (e.g., categories) | Thermal load level |
|---|---|
| Outdoor temperature | Levels 0 to 9 |
| Evaporator temperature | Levels 0 to 9 |
| Initial control value of electric compressor | Levels 0 to 9 |
| Blower driving level | Levels 0 to 9 |
| Indoor temperature | Levels 0 to 9 |

TABLE 1-continued

| Items (e.g., categories) | Thermal load level |
|---|---|
| Solar insolation | Levels 0 to 9 |
| Setting temperature | Levels 0 to 9 |

The controller 140 may set a thermal load level (e.g., a categorized thermal load level) to be lower (or higher) as a thermal load (e.g., a categorized thermal load) increases. As the thermal load level decreases, the thermal load may be relatively high/large, and as the thermal load level increases, the thermal load may be relatively low/small.

The controller 140 may determine the lowest level among the thermal load levels (e.g., the categorized thermal load levels) as the final thermal load level. For example, if the thermal load level of the outdoor temperature is level 3 and the blower driving level is level 2, the controller 140 may determine the thermal load level (e.g., the categorized thermal load level) determined as the thermal load caused by the blower driving level as the final thermal load level. Although some examples use two related parameters (a thermal load level and a thermal load), only one of the two related parameters may be used in certain implementations. As described above, the two related parameters may be in an inverse relationship and/or a reciprocal relationship (e.g., as a thermal load level increases, a thermal load decreases). Also one of ordinary skill in the art would understand that a thermal load level may be differently defined (e.g., as a thermal load level decreases, a thermal load decreases)

The controller 140 may calculate a control value of the electric compressor according to the final thermal load level. The control value calculated according to the final thermal load level may include (or may associated with) at least one of: the amount of reduction in the operating duty ratio of the electric compressor, a change rate of reduction in the operating duty ratio, a control holding time for which control of the electric compressor is maintained with the amount of reduction in the operating duty ratio, and/or a control prohibition time for which control of the electric compressor is prohibited with the amount of reduction in the operating duty ratio.

The controller 140 may calculate the control value to an extent the user may not perceive a change in temperature even though the electric compressor is controlled with the calculated control value. For example, the controller 140 may calculate the control value to an extent to cause the temperature of a vent to change within a first range (e.g., target temperature±3 degrees or any other degrees) and the average temperature of a head of a driver's seat or passenger to change within a second range (e.g., target temperature±1 degrees or any other degrees).

Figure 2:
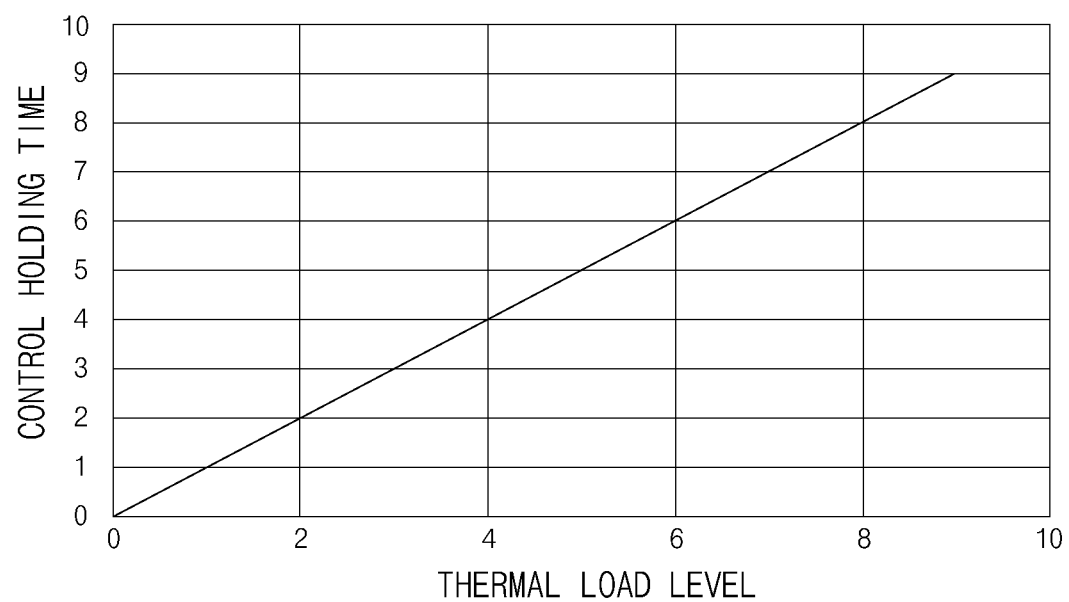
FIGS. 2 and 3 are example diagrams schematically illustrating relationships among parameters associated with control values.
Figure 3:
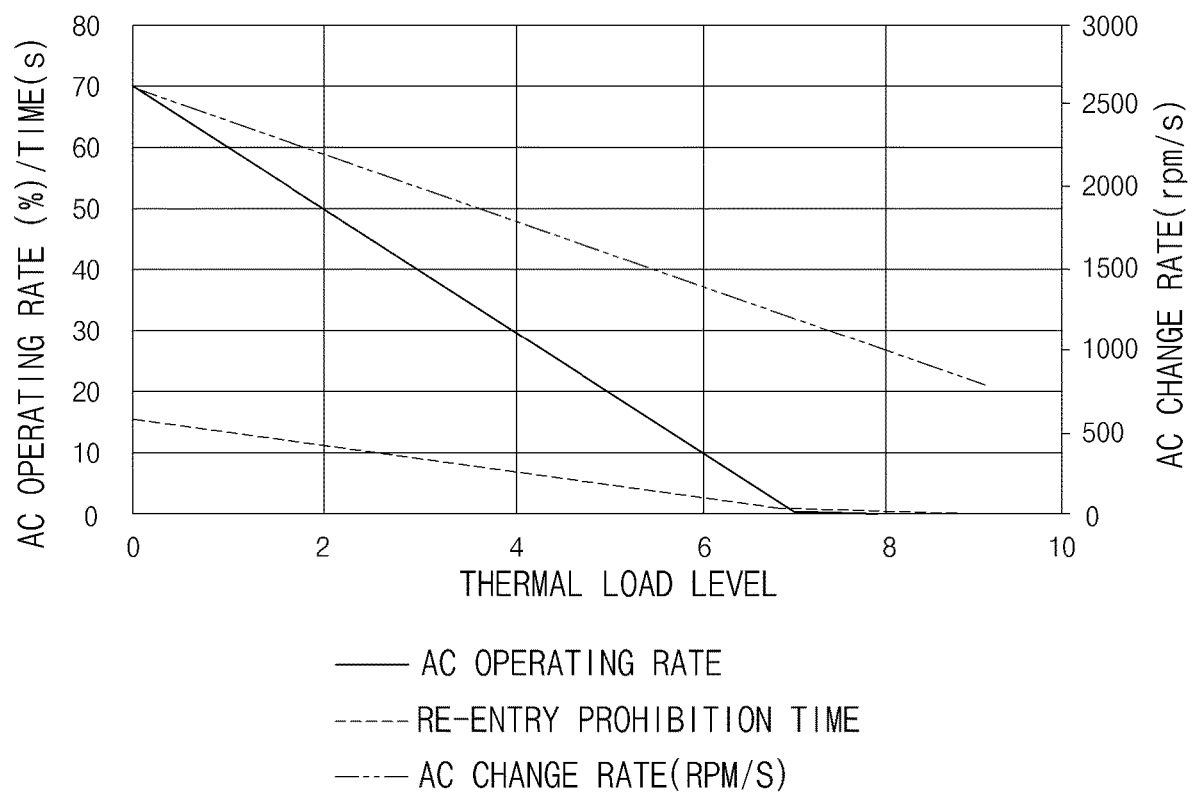

A more detailed description will be provided with reference to FIGS. 2 and 3 and Table 2.

FIGS. 2 and 3 are example diagrams schematically illustrating relationships among parameters associated with control values. Table 2 is an example table showing parameters associated with control values according to a final thermal load level.

As shown in FIG. 2, the controller 140 may perform control to increase a control holding time for which control of the electric compressor is maintained with the amount of reduction in the operating duty ratio of the electric compressor as the thermal load level increases (e.g., as the degree of thermal load decreases).

For example, when the thermal load level is level 0, the controller 140 may determine that the thermal load has the maximum and set, to zero, the control holding time for which control of the electric compressor is maintained with the amount of reduction in the operating duty ratio. For example, the controller 140 may prevent the electric compressor from being controlled with the amount of reduction in the operating duty ratio in a state where the thermal load caused by any one of the items in Table 1 has the maximum. The electric compressor may continue to operate in a state where the thermal load caused by any one of the items in Table 1 has the maximum. The thermal load is high (e.g., the thermal load level is low), for example, if the engine is in an active state for more than a threshold time period (e.g., the engine is hot).

As shown in FIG. 3, the controller 140 may set an Air conditioner (AC) operating rate (duty ratio) to be lower as the thermal load level increases (e.g., as the degree of thermal load decreases, the engine is getting cooler, etc.) to determine the amount of reduction in the operating duty ratio according to the thermal load level. The controller 140 may determine that the amount of reduction in the operating duty ratio increases (e.g., the AC's operating rate decreases) as the thermal load level increases. Also, the controller 140 may set the air conditioner (AC) change rate (the rotational speed (RPM) of the electric compressor) to be lower as the thermal load level increases (the degree of thermal load decreases).

The controller 140 may reduce the control prohibition time (e.g., a time period in which it is prohibited to control the AC and/or the compressor to operate with a lower operating rate) as the thermal load level increases (e.g., the degree of thermal load decreases). For example, the controller 140 may prevent the control of the electric compressor from being performed frequently with the amount of reduction in the operation duty ratio by increasing the control prohibition time of the electric compressor with the amount of reduction in the operation duty ratio, for example, because the degree of thermal load increases as the thermal load level decreases.

TABLE 2

| | 0 | 1 | 2 | 3 | 4 | 5 | 6 | 7 | 8 | 9 |
|---|---|---|---|---|---|---|---|---|---|---|
| Final Thermal load level | | | | | | | | | | |
| AC operating rate (%) | 70 | 60 | 50 | 40 | 30 | 20 | 10 | 0 | 0 | 0 |
| AC change rate (RPM/s) | 2800 | 2500 | 2300 | 2000 | 1900 | 1600 | 1400 | 1200 | 1000 | 800 |
| Holding time (s) | 0 | 1 | 2 | 3 | 4 | 5 | 6 | 7 | 8 | 9 |
| Prohibition time(s) | 255 | 245 | 235 | 225 | 215 | 205 | 195 | 10 | 10 | 10 |

The controller 140 may set a thermal load reference level. The controller 140 may determine whether the control prohibition time has elapsed from a time point associated with an expiration of the control holding time (e.g., a time point at which the control holding time has expired), for example, while the final thermal load level is less than the thermal load reference level.

The controller 140 may control the electric compressor with the calculated control value, for example, if it is determined that the control prohibition time has elapsed. A more detailed description will be provided with reference to FIGS. 4 and 5.

Figure 4:
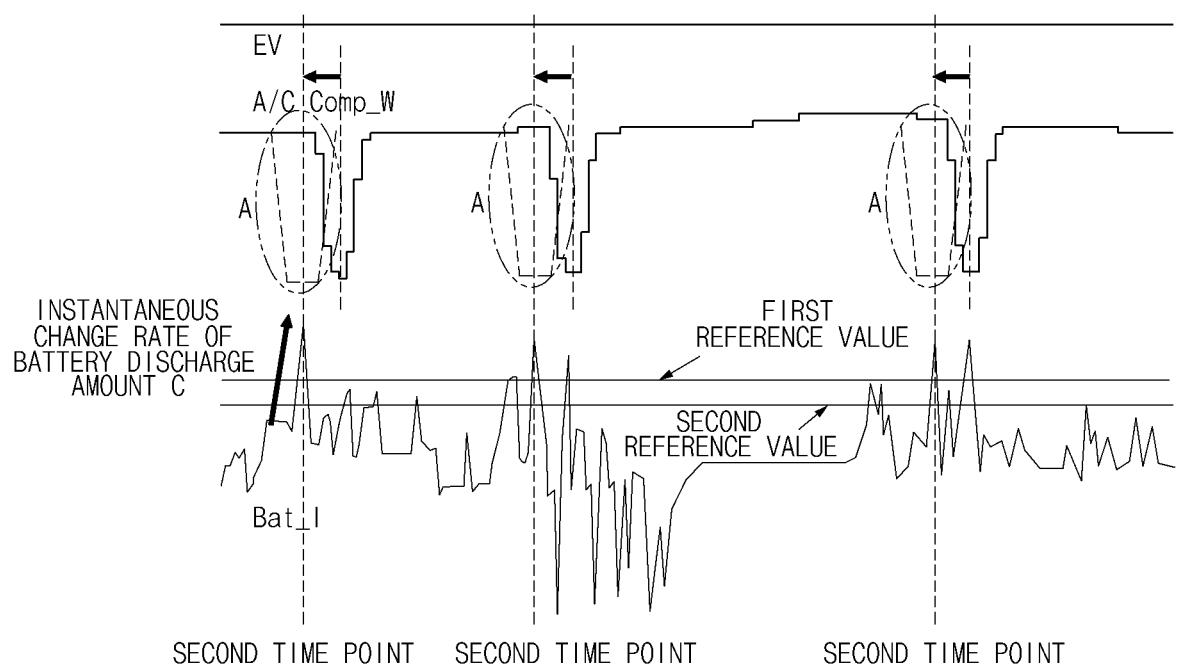
FIGS. 4 and 5 are example diagrams schematically illustrating an operation of a vehicle control apparatus.
Figure 5:
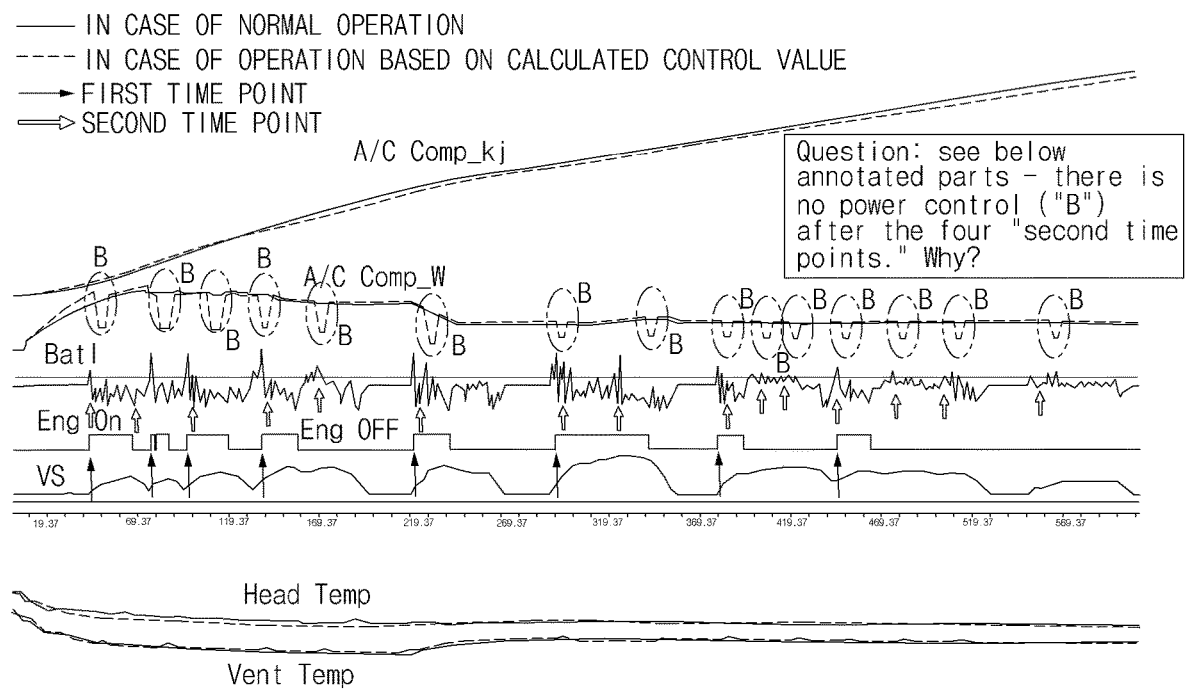

FIGS. 4 and 5 are example diagrams schematically illustrating an operation of a vehicle control apparatus.

Referring to FIG. 4, the controller 140 may control the electric compressor with the control value of the electric compressor (e.g., the amount of reduction in the operating duty ratio of the electric compressor) corresponding to the final thermal load level, for example, according to the final thermal load level at the second time point if the discharge amount of the battery exceeds the first reference value (A/s) (e.g., 5% of the capacity of the battery, or any other discharge amount), thus reducing the power (w) (and/or voltage, current, etc.) of the electric compressor as shown in "A" of FIG. 4.

Referring to FIG. 5, the controller 140 may control the electric compressor with the control value of the electric compressor (e.g., the amount of reduction in the operating duty ratio of the electric compressor) corresponding to the final thermal load level, for example, according to the final thermal load level at the first time point (e.g., a time point when the engine is switched to the ON state from the OFF state) and/or the second time point (e.g., the time point when the discharge amount of the battery exceeds the first reference value), thus reducing the power (w) of the electric compressor as shown in "B" of FIG. 5. Accordingly, the controller 140 may not change (or may not significantly change) the energy (kJ) of the electric compressor during a normal operation (e.g., when the electric compressor is controlled with the initial control value) and during a controlled operation (e.g., when the electric compressor is operated with the calculated control value), and may control/allow the head temperature of the driver's seat or passenger's seat (head temp) and the vent temperature (vent temp) to be maintained without a significant difference between the normal operation and the operation with the calculated control value.

Figure 6:
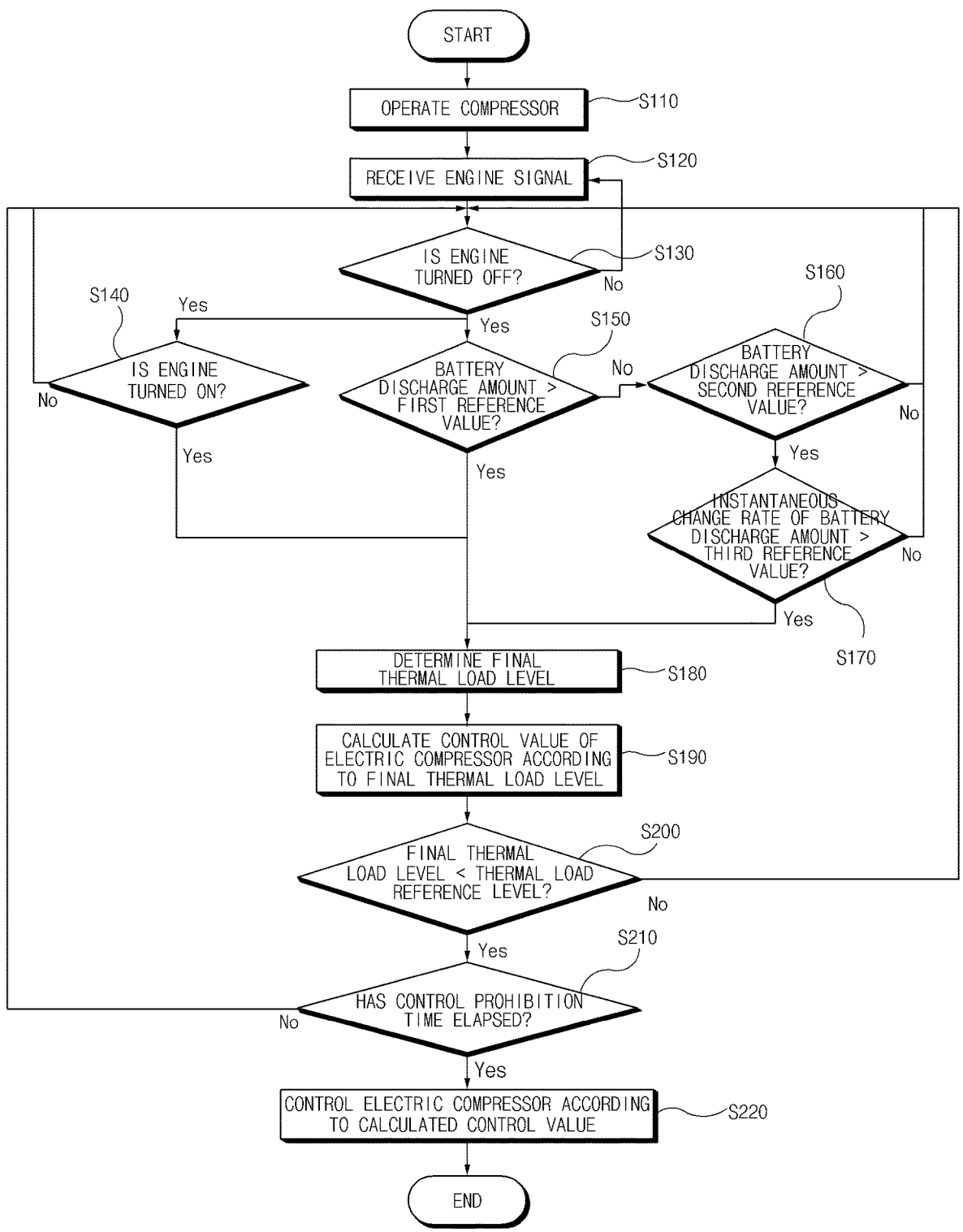
FIG. 6 is an example diagram illustrating a vehicle control method.

As shown in FIGS. 4 and 5, if the engine is switched from the first state (e.g., the dormant state, the OFF state) to the second state (e.g., the active sate, the ON state) or the discharge amount of the battery is excessive, the controller 140 may reduce the power of the electric compressor while maintaining the performance of the electric compressor to improve air conditioning fuel efficiency. Even if the power of the electric compressor is reduced, the controller 140 may maintain the indoor temperature to provide a comfortable indoor environment to the user (for example, using the energy generated based on the heat energy of the engine in an active state). FIG. 6 is a diagram illustrating an example vehicle control method. One or more steps and/or operations described with respect to FIG. 6 may be omitted and/or reordered. Additional step(s) and/or operation(s) may be added in addition to the steps and operations described with respect to FIG. 6.

Referring to FIG. 6, the controller 140 may operate the compressor (e.g., the electric compressor 130), for example, if an air conditioner is turned on by a user or a controller of a vehicle (S110).

The controller 140 may receive a control signal (e.g., an ON signal or an OFF signal) of the engine (e.g., an engine signal) from a hybrid control unit (S120).

The controller 140 may determine whether the engine is in a first state (e.g., a dormant state, an OFF state), for example, based on the received engine signal (S130).

The controller 140 may control/allow a vehicle to drive with operation (motor driving) in an electric vehicle (EV) mode (e.g., driving the vehicle with a motor powered by one or more batteries), for example, if it is determined that the engine is in the first state in S130.

The controller 140 may determine whether the engine is switched back to a second state (e.g., the active state, the ON state) from the first state (S140), for example, if it is determined that the engine is in the first state in S130 (Yes). If it is determined that the engine is switched back to the second state from the first state in S140, the controller 140 may determine a time point at which the engine is switched back to the second state from the first state as a first time point.

In S140, if the engine is not switched from the first state to the second state, the controller 140 may (e.g., continuously or periodically) determine a state of the engine (e.g., by receiving a signal from the engine or by detecting the state of the engine by an external device).

If it is determined that the engine is in the first state in S130 (Yes), the controller 140 may determine whether the discharge amount of the battery satisfies (e.g., exceeds) a first reference value (S150).

If it is determined that the discharge amount of the battery satisfies (e.g., exceeds) the first reference value while the engine is in the first state in S150 (Yes), the controller 140 may determine a time point at which the discharge amount of the battery satisfies (e.g., exceeds) the first reference value while the engine is in first state as a second time point.

If it is determined that the discharge amount of the battery does not satisfy (e.g., exceed) the first reference value while the engine is in the first state in S150 (No), the controller 140 may determine whether the discharge amount of the battery satisfies (e.g., exceeds) a second reference value (A/s) (e.g., that is smaller than the first reference value, (e.g., 3% of the capacity of the battery, or any other discharge amount) (S160).

If it is determined that the discharge amount of the battery satisfies (e.g., exceeds) the second reference value while the engine is in the first state in S160 (Yes), the controller 140 may determine whether a change rate (e.g., an instantaneous change rate) of the discharge amount(s) of the battery (see FIG. 4) satisfies (e.g., exceeds) a third reference value (A/s 2) (S170).

If it is determined that the change rate of the battery discharge amount(s) satisfies (e.g., exceeds) the third reference value in S170 (Yes), the controller 140 may determine a time point at which the change rate of the discharge amount(s) of the battery satisfies (e.g., exceeds) the third reference value as a third time point.

The controller 140 may determine a thermal load level (e.g., a final thermal load level) at any one of the first time point, the second time point, and the third time point determined as described above (S180).

For example, in S180, the controller 140 may determine thermal loads (e.g., categorized thermal loads) respectively caused by the vehicle's outdoor temperature, the evaporator temperature, an initial control value of the electric compressor, a blower driving level, the vehicle's indoor temperature, a solar insolation, and/or a setting temperature of the user. The controller 140 may determine a (e.g., categorized) thermal load level for each item based on each thermal load as shown in Table 1.

The controller 140 may set the (e.g., categorized) thermal load level to be lower as the (e.g., categorized) thermal load increases. As the thermal load level decreases, the thermal load may be high/large, and as the thermal load level increases, the thermal load may be low/small.

The controller 140 may determine the lowest level of the (e.g., categorized) thermal load levels as the final thermal load level. For example, if the thermal load level of the outdoor temperature is level 3 and the blower driving level is level 2, the controller 140 may determine the thermal load level determined as the thermal load caused by the blower driving level as the final thermal load level.

The controller 140 may calculate a control value of the electric compressor according to the thermal load level (e.g., the controlling thermal load level, the final thermal load level) (S190). The control value calculated according to the controlling/final thermal load level may include (or based on) at least one of: the amount of reduction in the operating duty ratio of the electric compressor, a change rate of reduction in the operating duty ratio, a control holding time for which control of the electric compressor is maintained with the amount of reduction in the operating duty ratio, and/or a control prohibition time for which control of the electric compressor is prohibited with the amount of reduction in the operating duty ratio.

In S190, the controller 140 may calculate the control value to an extent the user may not perceive a change in temperature even though the electric compressor is controlled with the calculated control value (e.g., when calculating a control value). For example, the controller 140 may calculate the control value to an extent to cause the temperature of an outlet to change within a first range (e.g., target temperature±3 degrees or any other degrees) and the average temperature of a head of a driver's seat or passenger to change within a second range (e.g., target temperature±1 degrees or any other degrees). A more detailed description has been provided with reference to FIGS. 2 and 3 and Table 2.

In S190, the controller 140 may perform control to increase a control holding time for which control of the electric compressor is maintained with the amount of reduction in the operating duty ratio of the electric compressor as the thermal load level increases (e.g., as the degree of thermal load decreases).

For example, if the thermal load level (e.g., the controlling/final thermal load level) is level 0, the controller 140 may determine that the thermal load has the maximum and the controller 140 may set, to a value (e.g., zero or any other value that reduces the control holding time), the control holding time for which control of the electric compressor is maintained with the amount of reduction in the operating duty ratio. For example, the controller 140 may prevent the electric compressor from being controlled with the amount of reduction in the operating duty ratio in a state where the thermal load according to any one of the items in Table 1 has the maximum.

The controller 140 may set an Air conditioner (AC) operating rate (duty ratio) to be lower as the controlling/final thermal load level increases (e.g., as the degree of controlling/final thermal load decreases) to determine the amount of reduction in the operating duty ratio according to the controlling/final thermal load level. The controller 140 may determine that the amount of reduction in the operating duty ratio increases as the thermal load level increases. Also, the controller 140 may set the air conditioner (AC) change rate (the rotational speed (RPM) of the electric compressor) to be lower as the thermal load level increases (e.g., the degree of controlling/final thermal load decreases).

The controller 140 may reduce the control prohibition time as the thermal load level increases (e.g., the degree of controlling/final thermal load decreases). Here, the controller 140 may prevent the control of the electric compressor from being performed frequently with the amount of reduction in the operation duty ratio by increasing the control prohibition time of the electric compressor with the amount of reduction in the operation duty ratio, for example, because the degree of thermal load increases as the thermal load level decreases.

The controller 140 may set a thermal load reference level and determine whether the controlling/final thermal load level is less than the thermal load reference level (S200)

If it is determined that the final thermal load level is less than the thermal load reference level in S200 (Yes), the controller 140 may determine whether the control prohibition time has elapsed (e.g., from a time point at which the control holding time has expired) (S210). If it is determined that the controlling/final thermal load level is greater than or equal to the thermal load reference level in S200 (No), the controller 140 may receive an engine signal again.

If it is determined that the control prohibition time has elapsed (e.g., from the time point at which the control holding time has expired) in S210, the controller 140 may control the electric compressor with the calculated control value (S220). A more detailed description has been provided with reference to FIGS. 4 and 5.

In S220, the controller 140 may control the electric compressor with the control value of the electric compressor (e.g., the amount of reduction in the operating duty ratio of the electric compressor) corresponding to the controlling/final thermal load level according to the controlling/final thermal load level at the second time point, for example, if the discharge amount of the battery satisfies (e.g., exceeds) the first reference value, thereby reducing the power (w) of the electric compressor as shown in "A" of FIG. 4.

In S220, the controller 140 may control the electric compressor with the control value of the electric compressor (e.g., the amount of reduction in the operating duty ratio of the electric compressor) corresponding to the controlling/final thermal load level according to the controlling/final thermal load level at the first time point (e.g., a time point when the engine is switched to the ON state from the OFF state) and the second time point (e.g., a time point when the discharge amount of the battery exceeds the first reference value), thereby reducing the power (w) of the electric compressor as shown in "B" of FIG. 5. The controller 140 may not change (or may not significantly change) the energy (kJ) of the electric compressor during a normal operation (e.g., when the electric compressor is controlled with the initial control value) and during a controlled operation (e.g., when the electric compressor is operated with the calculated control value), and/or the controller 140 may control/allow the head temperature of the driver's seat or passenger's seat (head temp) and the vent temperature (vent temp) to be maintained without a significant difference between the normal operation and the operation with the calculated control value.

If the engine is switched from the first state (e.g., the dormant state, the OFF state) to the second state (e.g., the active state, the ON state) or the discharge amount of the battery is excessive, the controller 140 may reduce the power of the electric compressor while maintaining the performance of the electric compressor to improve air conditioning fuel efficiency, and even when the power of the electric compressor is reduced, the indoor temperature may be efficiently controlled/maintained to provide a comfortable indoor environment to the user.

Figure 7:
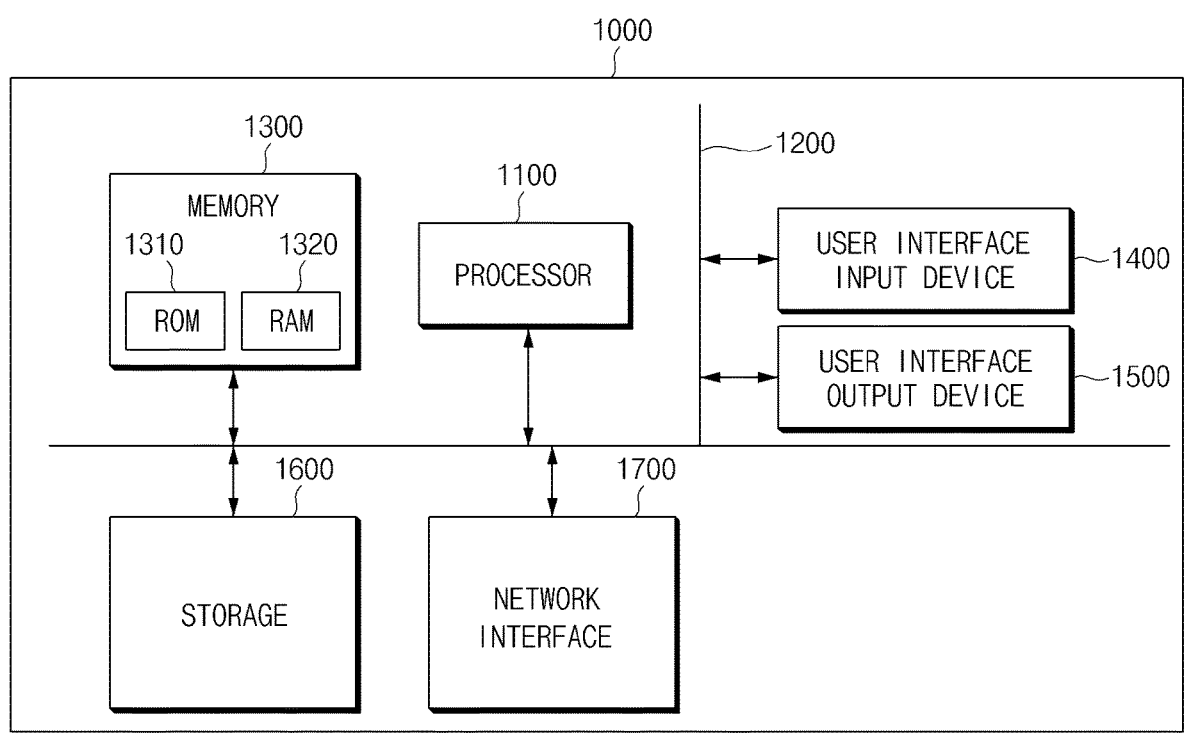
FIG. 7 is an example diagram illustrating a configuration of a computing system.

FIG. 7 is an example diagram showing a configuration of a computing system. The computing system may show one or more example components/elements of the device, apparatus, etc. described herein.

Referring to FIG. 7, a computing system 1000 may include at least one processor 1100, a memory 1300, a user interface input device 1400, a user interface output device 1500, storage 1600, and a network interface 1700, which are connected with each other (e.g., via a bus 1200).

The processor 1100 may be a central processing unit (CPU) or a semiconductor device that processes instructions stored in the memory 1300 and/or the storage 1600. The memory 1300 and/or the storage 1600 may include various types of volatile or non-volatile storage media. For example, the memory 1300 may include a ROM (Read Only Memory) 1310, a RAM (Random Access Memory) 1320, and/or any other types of memories.

The operations of the method(s), operation(s), process(es), and/or the algorithm(s) described in connection with the examples disclosed herein may be embodied directly in hardware and/or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a magnetic storage device (e.g., a hard disk), a solid-state memory device (e.g., a solid-state drive (SSD)), a removable disk, a CD-ROM, and/or any other types. The storage medium may be coupled to the processor 1100, and the processor 1100 may read information out of the storage medium and may record information in the storage medium. Alternatively or additionally, the storage medium may be integrated with the processor 1100. The processor and the storage medium may reside in an application specific integrated circuit (ASIC) or any other circuitry. The ASIC may reside within a user terminal or a user device, etc. In another case, the processor and the storage medium may reside in the user terminal/device as separate components.

An apparatus (e.g., the apparatus(s), devices, etc. described herein) may perform a method comprising multiple operations. The apparatus may comprise: a compressor configured to receive power from a battery; and a controller configured to: determine a thermal load level at one or more of: a first time point at which an engine is switched to an ON state from an OFF state; a second time point at which a first discharge amount of the battery exceeds a first reference value while the engine is in the OFF state; or a third time point at which a second discharge amount of the battery exceeds a second reference value smaller than the first reference value and a discharge rate associated with the battery exceeds a third reference value while the engine is in the OFF state; and control the compressor using a control value corresponding to the thermal load level. The controller may be configured to determine the thermal load level based on categorized thermal loads, wherein each categorized thermal load of the categorized thermal loads is caused by at least one of: an outdoor temperature of a vehicle, an evaporator temperature, an initial control value of the compressor, a blower driving level, an indoor temperature of the vehicle, or a solar insolation. The controller may be configured to determine categorized thermal load levels respectively associated with the categorized thermal loads. The categorized thermal load levels may decrease as the categorized thermal loads increase. The controller may be configured to determine a lowest level among the categorized thermal load levels as the determined thermal load level. The controller may be configured to calculate the control value for the compressor according to the determined thermal load level. The controller may be configured to calculate the control value. The control value may be associated with at least one of: an amount of reduction in an operating duty ratio of the compressor; a change rate of reduction in the operating duty ratio; a control holding time for which control of the compressor is maintained with the amount of reduction in the operating duty ratio; or a control prohibition time for which control of the compressor is prohibited with the amount of reduction in the operating duty ratio. The controller may be configured to set a thermal load reference level. The controller may be configured to, based on the thermal load level being less than the thermal load reference level, determine whether the control prohibition time has elapsed from a time point associated with an expiration of the control holding time. The controller may be configured to control, based on the control prohibition time having been elapsed, the compressor. The controller may control, based on the control prohibition time having been elapsed, the compressor. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An apparatus (e.g., the apparatus(s), devices, etc. described herein) may perform a method comprising multiple operations. The apparatus may comprise an air conditioner configured to receive power from a battery; and a controller configured to: determine a thermal load level based on one or more of: a first discharge amount of the battery satisfying a first reference value while an engine is in a dormant state, wherein the engine is configured to operate a vehicle using a non-electric power source; or a second discharge amount of the battery satisfying a second reference value and a discharge rate associated with the battery satisfying a third reference value while the engine is in the dormant state; and control the air conditioner using a control value corresponding to the thermal load level. The controller may be configured to: determine, based on the engine being switched to an active state from the dormant state, a second thermal load level; and control the air conditioner using a second control value corresponding to the second thermal load level. The controller may be configured to: control the engine, using the non-electric power source and while the engine is in an active state, to operate the vehicle; and control a motor, using one or more batteries and while the engine is in the dormant state, to operate the vehicle, wherein the air conditioner comprises a compressor. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An aspect of the present disclosure provides a vehicle control apparatus and a vehicle control method capable of improving air conditioning fuel efficiency by adjusting an operation amount of an electric compressor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include an electric compressor that receives power from a battery for driving and a controller that determines a final thermal load level at one of a first time point at which an engine is switched to an ON state from an OFF state, a second time point at which a discharge amount of the battery exceeds a first reference value while the engine is in the OFF state, and a third time point at which the discharge amount of the battery exceeds a second reference value smaller than the first reference value and a change rate of the discharge amount of the battery exceeds a third reference value while the engine is in the OFF state, and determines whether to operate the electric compressor with a control value of the electric compressor corresponding to the final thermal load level according to the final thermal load level.

The controller may determine thermal load levels based on thermal loads caused by a vehicle's outdoor temperature, an evaporator temperature, an initial control value of the electric compressor, a blower driving level, the vehicle's indoor temperature, and a solar insolation, respectively.

The controller may set the thermal load level to be lower as the thermal load increases.

The controller may determine a lowest level of the thermal load levels as the final thermal load level.

The controller may calculate a control value for the electric compressor according to the final thermal load level.

The controller may calculate, as the control value, an amount of reduction in an operating duty ratio of the electric compressor, a change rate of reduction in the operating duty ratio, a control holding time for which control of the electric compressor is maintained with the amount of reduction in the operating duty ratio, and a control prohibition time for which control of the electric compressor is prohibited with the amount of reduction in the operating duty ratio.

The controller may set a thermal load reference level, and when the final thermal load level is less than the thermal load reference level, determine whether the control prohibition time has elapsed from a time point when the control holding time has expired.

The controller may control the operation of the electric compressor with the calculated control value when the control prohibition time has elapsed.

According to an aspect of the present disclosure, a vehicle control method may include determining a final thermal load level at one of a first time point at which an engine is switched to an ON state from an OFF state, a second time point at which a discharge amount of the battery exceeds a first reference value while the engine is in the OFF state, and a third time point at which the discharge amount of the battery exceeds a second reference value smaller than the first reference value and a change rate of the discharge amount of the battery exceeds a third reference value while the engine is in the OFF state, and determining whether to operate the electric compressor with a control value of the electric compressor corresponding to the final thermal load level according to the final thermal load level.

The vehicle control method may further include determining thermal load levels based on thermal loads caused by a vehicle's outdoor temperature, an evaporator temperature, an initial control value of the electric compressor, a blower driving level, the vehicle's indoor temperature, and a solar insolation, respectively.

The vehicle control method may further include setting the thermal load level to be lower as the thermal load increases.

The vehicle control method may further include determining a lowest level of the thermal load levels as the final thermal load level.

The vehicle control method may further include calculating a control value for the electric compressor according to the final thermal load level.

The vehicle control method may further include calculating, as the control value, an amount of reduction in an operating duty ratio of the electric compressor, a change rate of reduction in the operating duty ratio, a control holding time for which control of the electric compressor is maintained with the amount of reduction in the operating duty ratio, and a control prohibition time for which control of the electric compressor is prohibited with the amount of reduction in the operating duty ratio.

The vehicle control method may further include setting a thermal load reference level, and when the final thermal load level is less than the thermal load reference level, determining whether the control prohibition time has elapsed from a time point when the control holding time has expired.

The vehicle control method may further include controlling the operation of the electric compressor with the calculated control value when the control prohibition time has elapsed.

The above description is merely illustrative of the technical idea of the present disclosure, and various modifications and variations may be made without departing from the essential characteristics of the present disclosure by those skilled in the art to which the present disclosure pertains.

Therefore, the examples of the present disclosure are provided to explain the spirit and scope of the present disclosure, but not to limit them, so that the spirit and scope of the present disclosure is not limited by any particular examples. The scope of protection of the present disclosure should be interpreted by the following claims, and all technical ideas within the scope equivalent thereto should be construed as being included in the scope of the present disclosure.

According to the vehicle control apparatus and method, it may be possible to reduce the power of the electric compressor while maintaining the performance of the electric compressor when the engine is switched from a first state (e.g., the OFF state) to a second state (e.g., the ON state) or the discharge amount of the battery is excessive, and/or to improve air conditioning fuel efficiency. Even when the power of the electric compressor is reduced, the indoor temperature may be efficiently controlled and/or maintained to provide a comfortable indoor environment to the user.

Hereinabove, although the present disclosure has been described with reference to exemplary embodiment(s) and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle control apparatus comprising:
a compressor configured to receive power from a battery; and
a controller configured to:
determine a thermal load level at one or more of:
a time point at which a first discharge amount of the battery exceeds a first reference value while an engine is in an OFF state; or
a time point at which a second discharge amount of the battery exceeds a second reference value smaller than the first reference value and a discharge rate associated with the battery exceeds a third reference value while the engine is in the OFF state; and
control the compressor using a control value corresponding to the thermal load level.

2. The vehicle control apparatus of claim 1, wherein the controller is configured to determine the thermal load level based on categorized thermal loads, wherein each categorized thermal load of the categorized thermal loads is caused by at least one of:
an outdoor temperature of a vehicle, an evaporator temperature, an initial control value of the compressor, a blower driving level, an indoor temperature of the vehicle, or a solar insolation.

3. The vehicle control apparatus of claim 2, wherein the controller is configured to determine categorized thermal load levels respectively associated with the categorized thermal loads, and
wherein the categorized thermal load levels decrease as the categorized thermal loads increase.

4. The vehicle control apparatus of claim 3, wherein the controller is configured to determine a lowest level among the categorized thermal load levels as the determined thermal load level.

5. The vehicle control apparatus of claim 1, wherein the controller is configured to calculate the control value for the compressor according to the determined thermal load level.

6. The vehicle control apparatus of claim 1, wherein the controller is configured to calculate the control value, wherein the control value is associated with at least one of:
an amount of reduction in an operating duty ratio of the compressor;
a change rate of reduction in the operating duty ratio;
a control holding time for which control of the compressor is maintained with the amount of reduction in the operating duty ratio; or
a control prohibition time for which control of the compressor is prohibited with the amount of reduction in the operating duty ratio.

7. The vehicle control apparatus of claim 6, wherein the controller is configured to set a thermal load reference level, and
wherein the controller is configured to, based on the thermal load level being less than the thermal load reference level, determine whether the control prohibition time has elapsed from a time point associated with an expiration of the control holding time.

8. The vehicle control apparatus of claim 7, wherein the controller is configured to control, based on the control prohibition time having been elapsed, the compressor.

9. A vehicle control method comprising:
determining a thermal load level at one or more of:
a time point at which a first discharge amount of a battery exceeds a first reference value while an engine is in an OFF state; or
a time point at which a second discharge amount of the battery exceeds a second reference value smaller than the first reference value and a discharge rate associated with the battery exceeds a third reference value while the engine is in the OFF state; and
controlling a compressor, configured to receive power from the battery, using a control value corresponding to the thermal load level.

10. The vehicle control method of claim 9, further comprising:
determining the thermal load level based on categorized thermal loads, wherein each categorized thermal load of the categorized thermal loads is caused by at least one of:
an outdoor temperature of a vehicle, an evaporator temperature, an initial control value of the compressor, a blower driving level, an indoor temperature of the vehicle, or a solar insolation.

11. The vehicle control method of claim 10, further comprising:
determining categorized thermal load levels respectively associated with the categorized thermal loads; and
setting the categorized thermal load levels decrease as the categorized thermal loads increase.

12. The vehicle control method of claim 11, further comprising:
determining a lowest level among the categorized thermal load levels as the determined thermal load level.

13. The vehicle control method of claim 9, further comprising:
calculating the control value for the compressor according to the determined thermal load level.

14. The vehicle control method of claim 9, further comprising:
calculating the control value, wherein the control value is associated with at least one of:
an amount of reduction in an operating duty ratio of the compressor;
a change rate of reduction in the operating duty ratio;
a control holding time for which control of the compressor is maintained with the amount of reduction in the operating duty ratio; or
a control prohibition time for which control of the compressor is prohibited with the amount of reduction in the operating duty ratio.

15. The vehicle control method of claim 14, further comprising:
setting a thermal load reference level, and
based on the thermal load level being less than the thermal load reference level, determining whether the control prohibition time has elapsed from a time point associated with an expiration of the control holding time.

16. The vehicle control method of claim 15, further comprising:
controlling, based on the control prohibition time having been elapsed, the compressor.

17. The vehicle control method of claim 9, further comprising:
  controlling the engine, using a non-electric power source and while the engine is in the ON state, to operate a vehicle; and
  controlling a motor, using one or more batteries and while the engine is in the OFF state, to operate the vehicle.

18. An apparatus comprising:
  an air conditioner configured to receive power from a battery; and
  a controller configured to:
    determine a thermal load level based on one or more of:
      a first discharge amount of the battery satisfying a first reference value while an engine is in a dormant state, wherein the engine is configured to operate a vehicle using a non-electric power source; or
      a second discharge amount of the battery satisfying a second reference value and a discharge rate associated with the battery satisfying a third reference value while the engine is in the dormant state; and
    control the air conditioner using a control value corresponding to the thermal load level.

19. The apparatus of claim 18, wherein the controller is configured to:
  determine, based on the engine being switched to an active state from the dormant state, a second thermal load level; and
  control the air conditioner using a second control value corresponding to the second thermal load level.

20. The apparatus of claim 18, wherein the controller is configured to:
  control the engine, using the non-electric power source and while the engine is in an active state, to operate the vehicle; and
  control a motor, using one or more batteries and while the engine is in the dormant state, to operate the vehicle, wherein the air conditioner comprises a compressor.

* * * * *